(12) United States Patent  (10) Patent No.: US 8,714,475 B2
Gall et al.  (45) Date of Patent: May 6, 2014

(54) AIRCRAFT WITH REDUCED ENVIRONMENTAL IMPACT

(71) Applicant: Airbus Operations (SAS), Toulouse (FR)

(72) Inventors: Pierre-Emmanuel Gall, Toulouse (FR); Guillaume Gallant, Lareole (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 13/973,688

(22) Filed: Aug. 22, 2013

(65) Prior Publication Data

US 2013/0334365 A1 Dec. 19, 2013

Related U.S. Application Data

(63) Continuation of application No. PCT/FR2012/050384, filed on Feb. 23, 2012.

(30) Foreign Application Priority Data

Feb. 25, 2011 (FR) ...................................... 11 51584

(51) Int. Cl.
*B64C 1/40* (2006.01)
(52) U.S. Cl.
USPC ......................................................... 244/1 N
(58) Field of Classification Search
USPC ................... 244/1 N, 55, 46, 129.1
See application file for complete search history.

(56) References Cited

U.S. PATENT DOCUMENTS

| 4,460,138 A | 7/1984 | Sankrithi |
| 5,651,513 A | 7/1997 | Arena |
| 7,883,049 B2 * | 2/2011 | Nesbitt et al. ................. 244/1 N |
| 7,900,865 B2 * | 3/2011 | Moore et al. ................. 244/1 N |
| 7,926,760 B2 * | 4/2011 | Gall et al. ....................... 244/55 |
| 8,011,613 B2 * | 9/2011 | Belleville ...................... 244/1 N |
| 8,087,607 B2 * | 1/2012 | Moore et al. ................. 244/1 N |
| 2008/0142641 A1 | 6/2008 | Moore |
| 2008/0191087 A1 | 8/2008 | Cros |
| 2008/0258005 A1 * | 10/2008 | Gall et al. ....................... 244/55 |
| 2009/0045287 A1 | 2/2009 | Belleville |

(Continued)

FOREIGN PATENT DOCUMENTS

| FR | 812.036 | 4/1997 |
| FR | 2 856 655 | 12/2004 |
| FR | 2 905 356 | 3/2008 |
| FR | 2 915 179 | 10/2008 |

(Continued)

OTHER PUBLICATIONS

International Search Report dated Jun. 28, 2012.

*Primary Examiner* — Christopher P Ellis
(74) *Attorney, Agent, or Firm* — Dickinson Wright PLLC

(57) ABSTRACT

An aircraft with reduced environmental impact includes two turboprop engines mounted on the back of the aircraft at the rear thereof, and one acoustic masking device per turboprop engine. The acoustic masking device includes a masking element, such as a flap, which can move between a position in which it is retracted into the wing, and a position in which it is extended toward the rear of the wing. In the extended position, the flap intercepts the noise area generated toward the front by the turboprop engine, so as to reduce the perception of noise on the ground.

17 Claims, 8 Drawing Sheets

(A-A)

(56) References Cited

U.S. PATENT DOCUMENTS

| | | |
|---|---|---|
| 2009/0057493 A1 | 3/2009 | Sankrithi |
| 2010/0264264 A1 | 10/2010 | Gall |
| 2012/0068011 A1* | 3/2012 | Thomas et al. ............... 244/1 N |
| 2012/0091270 A1* | 4/2012 | Moore et al. .................. 244/1 N |
| 2012/0256049 A1* | 10/2012 | Shmilovich et al. .......... 244/1 N |
| 2012/0292441 A1* | 11/2012 | Drela et al. ................... 244/1 N |

FOREIGN PATENT DOCUMENTS

| | | |
|---|---|---|
| FR | 2 942 202 | 8/2010 |
| GB | 489853 | 8/1938 |
| GB | 1 463 810 | 2/1977 |

* cited by examiner (A-A)

(A-A)

(B-B)

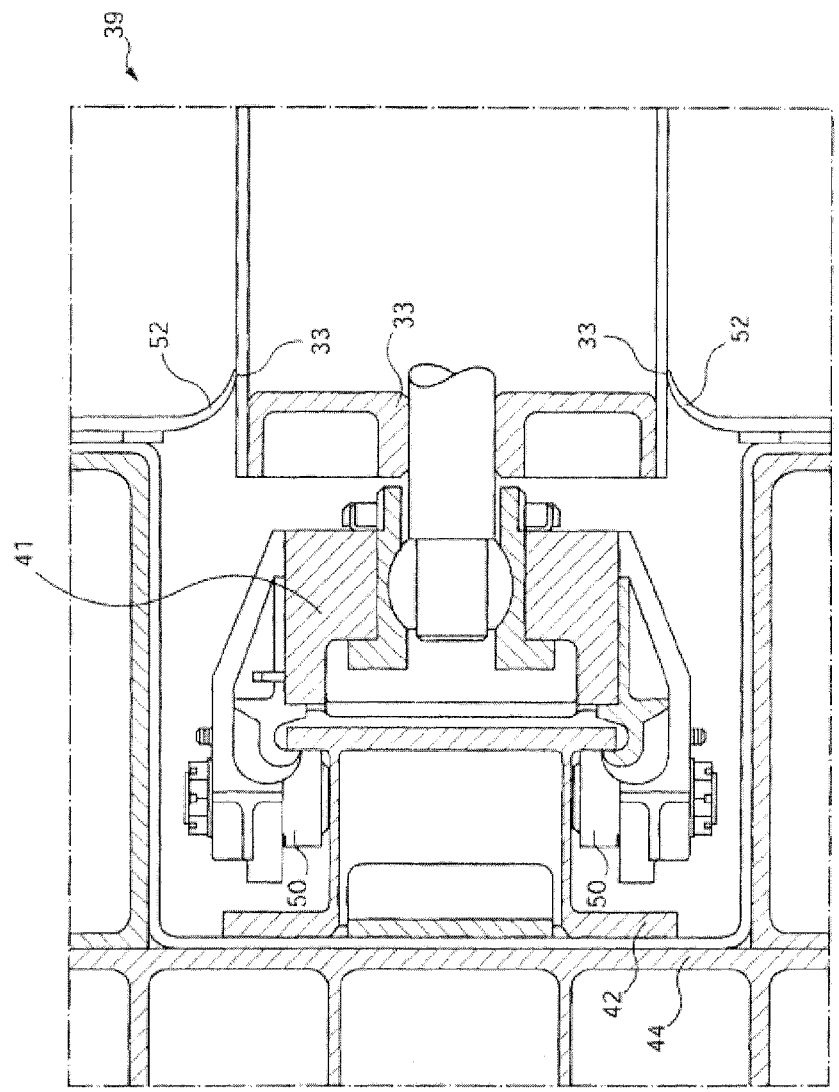
Fig. 9 (C-C)

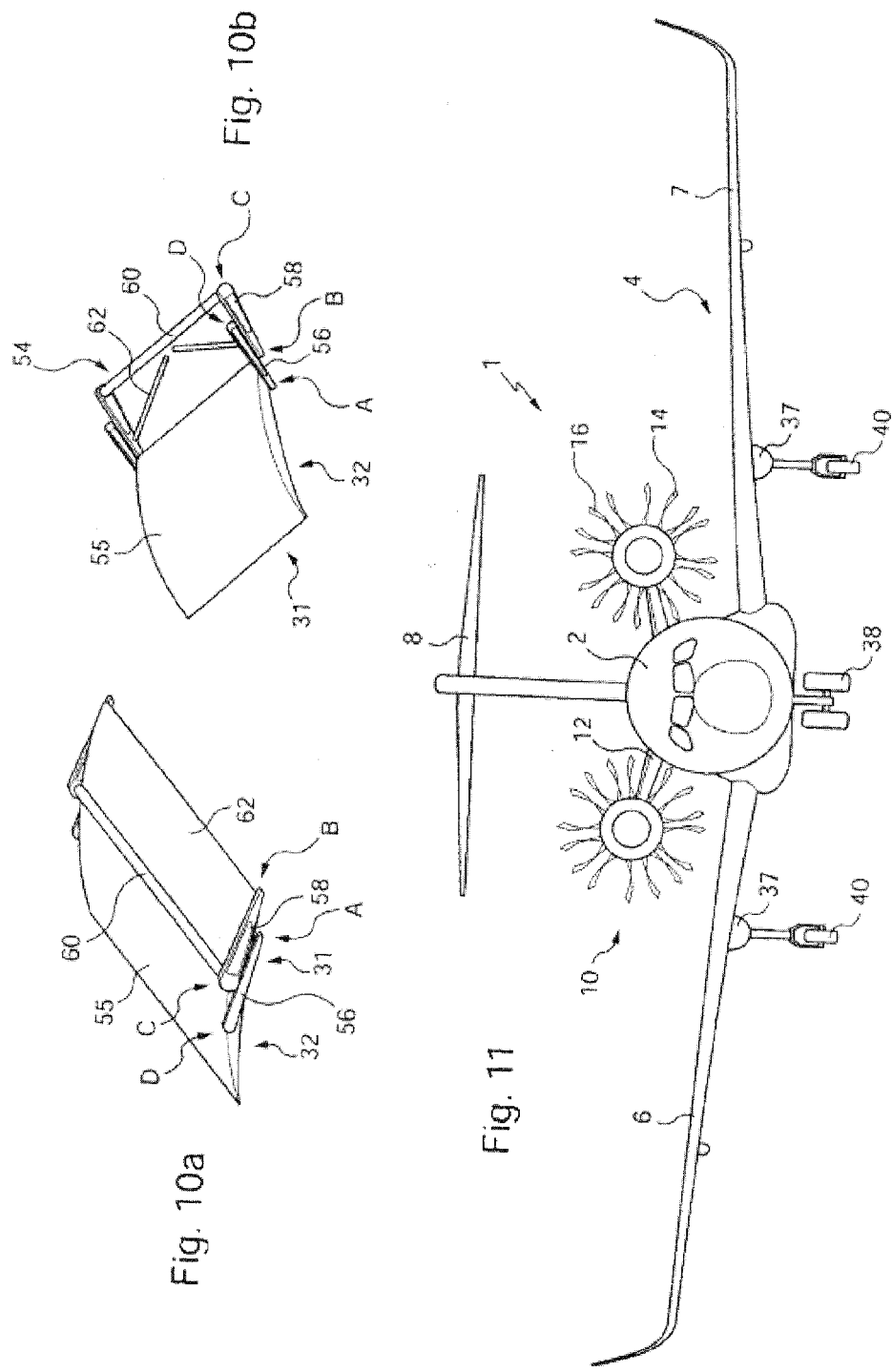

AIRCRAFT WITH REDUCED ENVIRONMENTAL IMPACT

CROSS REFERENCE TO RELATED APPLICATION

This application is a bypass continuation of PCT/FR2012/050384 filed Feb. 23, 2012 which is entitled to and claims the benefit of French Application No. 1151584 filed Feb. 25, 2011, the disclosure of each of which, including the specification, claims, drawings and abstract, are incorporated herein by reference in their entirety.

FIELD

The invention relates to an aircraft with reduced environmental impact.

BACKGROUND

In the field of short- to medium-haul aircraft, and aviation in general, optimizing fuel use is a factor essential to profitability.

Conventionally, such aircraft are equipped with turbojets which are a compromise between energy cost and the impact on the environment. In fact, other propulsion systems, such as propulsion engines with contrarotating propellers, allow a 20% fuel economy, but are often disregarded due to the unwanted noise they cause. For this type of motorization, the sources of noise to be considered are:
  the noise of each propeller itself, due to the pass frequency of the blades and their harmonics, which is a noise of low-frequency type and as a result difficult to mask and
  the interaction noise between the propellers.

The applicant has already noted that each propeller's own noise could be reduced, so that the preponderant noise is that resulting from the interaction between the propellers. He has also been able to determine, by experimental and numerical routes, the source zones of the noise for a turboprop engine with contrarotating propellers which can be modelled by:
  a first conical lobe directed forwards from said turboprop engine and centred on the axis thereof, its peak being located approximately midway between the planes of the propellers;
  a second conical lobe directed aft from said turboprop engine and centred on the axis thereof, its peak being approximately midway between the planes of the propellers;

Thus, in patent application FR 2 905 356, the Applicant disclosed the benefit of masking the upstream noise lobe by the aerofoil and presented several solutions, in particular:
  simply moving the aerofoil aft;
  adding a supplementary aerofoil surface called a noseplane in order to compensate for the reduction in the handling quality due to moving the aerofoil aft;
  using a forward-swept aerofoil in order to reduce the extent of aft movement of the aerodynamic centre compared to a conventional sweep aerofoil.

SUMMARY

The present invention proposes a novel aircraft configuration making it possible to reduce the noise generated by the motorization via the use of at least one acoustic masking device.

The invention relates more particularly to an aircraft with reduced environmental impact, comprising at least one propeller- or jet engine generating noise forwards, mounted on the back of the aircraft, and an aerofoil; the noise generated by said at least one engine being broadcast within a noise zone, characterized in that said aircraft comprises at least one acoustic masking device comprising at least one masking element which is capable of moving between, on the one hand, a retracted position and, on the other hand, a deployed position in which said at least one masking element intercepts the noise zone so as to reduce the perception on the ground of the noise broadcast by said at least one engine, the acoustic masking element being moved aft into its deployed position so as to increase the chord at the root of the aerofoil.

Advantageously, an engine of the turboprop type (non-faired propellers) will be used for example to enable a significant reduction in fuel consumption.

The applicant has noted that the determining parameter for the acoustic masking is the surface area of the aerofoil and its position with respect to the engine, the chord at the root of the aerofoil being the most representative. For that reason, the efficiency of the acoustic masking is increased, the further aft and the larger the chord. In fact, the theoretical optimum position of the aerofoil moved aft is situated slightly forward of the engine, but this cannot be achieved due to the position of the engine with respect to the aerofoil (heightwise). A high position of the engine, or even a rear fuselage nacelle (RFN) position in which the engines are situated at the rear of the fuselage, above a tail unit acting as a mask for the noise emitted downstream of each of the engines, will for this reason be more suited to masking by the aerofoil.

Moving said at least one acoustic masking device makes it possible to restrict the dimensions (chord) and aft movement of the aerofoil.

The use of said at least one deployable acoustic masking element in fact makes it possible to reduce the noise without necessarily needing to alter the position of the aerofoil, which does not need to be placed directly below the engine. It is nevertheless equally possible to move the position of the aerofoil aft in order to amplify the effect of acoustic attenuation as mentioned above.

According to a possible feature, the masking element is in a retracted position in the cruising phase and in deployed position in the take-off, landing and/or approach phase.

Thus, advantageously, the noise reduction takes place during the flight phases where the noise is the most undesirable, i.e. when the aircraft is closer to the ground.

The invention also relates to an aircraft comprising moreover a fuselage provided with an aerofoil comprising two symmetrical wings, said at least one engine being mounted at the rear of the aircraft between said wings and the aftmost end of the aircraft.

The fact that the engine is not placed directly above of the wings in fact makes it possible, in the event of loss of integrity of the engine or of its rotor mast (breaking of a rotary component, detachment of the engine, etc.) to protect the aerofoil and therefore avoid the need to apply stiffening pieces thereto, involving an increase in the mass of the aircraft.

The invention also relates to an aircraft comprising moreover a fuselage provided with an aerofoil comprising two symmetrical wings and at least one horizontal aft tail unit, said at least one engine being mounted at the rear of the aircraft between said wings and said horizontal tail unit, an acoustic masking device being associated with each of the wings, said at least one masking element of each device being capable of moving between a retracted position and a deployed position so as to increase the chord of the root of each of the wings.

Advantageously, said at least one device comprises means for moving said at least one masking element in order to pass from one position to another.

According to an embodiment optimizing the position of the masking device and the available space, said at least one masking element of said at least one device is composed of at least one flap.

In this case, the invention can be implemented in a conventional commercial aircraft configuration, by replacing the inner flaps by the flaps of the acoustic masking device (for example at least one acoustic flap per wing), the latter ensuring both a low-speed aerodynamic function (augmented lift) and the acoustic masking element function.

According to a feature, said at least one masking element comprises a main flap and at least one secondary flap.

According to a particular embodiment, the main flap is rigid and said at least one secondary flap is made from a flexible fabric.

Such an arrangement makes it possible to obtain, in a deployed position, a very substantial movement aft and therefore a very high efficiency of acoustic masking.

The advantage of using a flexible fabric is that it can be stored rolled, making it possible to optimize the available space needed, such as the available space situated behind the aft longeron of the aerofoil.

To this end, said at least one masking device comprises a rolling/unrolling system making it possible according to need to roll and unroll the flexible fabric. The fabric is tensioned in the unrolled position.

According to a feature, said at least one acoustic masking device comprises a system of traveler(s) and track(s) serving to guide the movement of the traveler during the movement of said at least one masking element.

For an aircraft according to the invention comprising at least one fairing linked to the aerofoil, the system of traveler(s) and track(s) comprises two tracks housed respectively in the fuselage and in said at least one fairing. This configuration offers possibilities of synergy with the position of the auxiliary undercarriage, preferably housed in the fairings. Noise reduction in fact offers the opportunity for a reduction in fuel consumption. This is the case in particular for large-wingspan aerofoil configurations (for which the aircraft's stability on the ground requires a large track), but also for configurations defined hereinafter such as:

with aft engine(s) in which the aerofoil is moved aft in comparison to a more conventional aircraft with optimized aerofoil having a high aspect-ratio and low sweep.

Advantageously, a configuration with a large-wingspan aerofoil can be associated with a configuration having an optimized aerofoil with a high aspect-ratio and low sweep.

According to a feature, the aircraft can comprise two fairings linked to the aerofoil, a main central undercarriage and two auxiliary undercarriages of the shock-compensating rocker beam type respectively housed in the two fairings.

This makes it possible in particular to optimize the volume available to house fuel tanks and to reduce undue loading on the aerofoil. Moreover, the use of auxiliary undercarriages allows a large undercarriage track to be obtained, providing sufficient stability on the ground while minimizing the height of the fairings.

Advantageously, the fairing(s) in question are those known as "Küchemann" fairings situated substantially in the middle of each wing of the aerofoil.

The benefit of "Küchemann's carrots" is well known to a person skilled in the art for improving aircraft performance by using the Whitcomb area rule.

The choice of this type of fairing falls within the scope of the synergy described above. In fact Küchemann fairings are from this point of view the most suitable for the storage of auxiliary undercarriages, thus avoiding the use of a conventional undercarriage on the aerofoil which would be difficult to implement on a very fine aerofoil and/or having a small absolute thickness.

According to another embodiment, the means for moving said at least one masking element, which is, for example, composed of at least one flap, comprise a deformable parallelogram.

The major benefit of this movement means is that it is very simple (both not very complex and light) while providing a very significant extension to said at least one rigid flap. The very significant extension makes the local chord of the aerofoil very long when it is deployed, and comes considerably closer to the source of noise to be masked. In particular, this type of configuration makes it possible to respond easily and efficiently to environment constraints without having to change significantly the design of an aircraft having a configuration that is already optimized in terms of fuel consumption, maintenance, complexity and operation.

According to a feature, the deformable parallelogram comprises at least one torsion bar, at least one guide arm and at least one movement rod, moving said parallelogram being ensured by the rotation of said torsion bar.

Advantageously, the aircraft wings have a small sweep and a large aspect-ratio so as to improve the aerodynamic performance at low and high speed, and therefore reduce the fuel consumption. A concomitant effect is a reduction in the volume of the fuel tanks.

For example, the volume can be reduced by 6%, said sweep being at most equal to 22° and said aspect-ratio at least equal to 10. Preferably, the sweep is comprised between 15° and 22°. Thus, the aircraft has excellent performance on take-off and landing, in particular the ability to rise into the air more quickly and to land more slowly. This contributes to an even further reduction in the noise generated on take-off and landing.

As the present invention can moreover have an aerofoil configuration that is moved aft, the aircraft can comprise at the front of the fuselage an aerofoil surface called a noseplane.

BRIEF DESCRIPTION OF DRAWINGS

Other features and advantages will become apparent during the following description given by way of non-limitative example, with reference to the attached drawings, in which:

FIG. 9 is a diagrammatic view in cross section of the section C-C in FIG. 8,

FIG. 10a is a diagrammatic perspective view of a fourth embodiment of an acoustic masking device in the retracted position;

FIG. 10b is a diagrammatic perspective view of the masking device in FIG. 10a in the deployed position;

FIG. 11 is a diagrammatic front view of the aircraft in FIG. 1a,

FIGS. 1a and 1b show an example of an aircraft with reduced environmental impact according to the invention.

DETAILED DESCRIPTION OF EMBODIMENTS

Figure 1A:
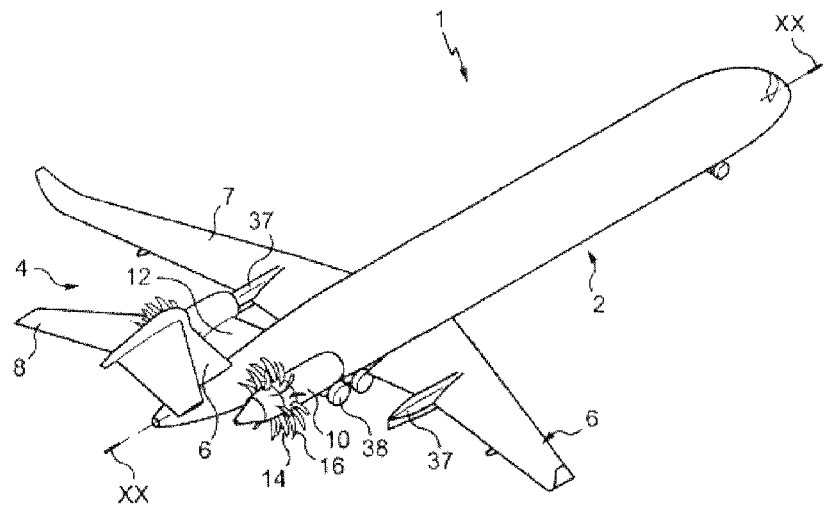
FIG. 1a is a diagrammatic perspective view of an aircraft according to the invention, the acoustic masking device of which is in the retracted position.

The aircraft 1 has a longitudinal axis XX' and comprises an elongated fuselage 2 following this axis and an aerofoil 4 composed of two symmetrical wings 6 and 7 and a horizontal aft tail unit 8. The wings 6, 7 do not carry an engine in this embodiment.

Two piston or jet engines are mounted at the rear of the fuselage 2, more particularly turboprop propeller engines 10 arranged on the back of said aircraft 1 with their axes YY' (FIG. 2) parallel to the longitudinal axis XX'. The turboprop engines 10 are supported by pylons 12 and are arranged side by side in a symmetrical manner, between the aerofoil and the tail unit 8. Each turboprop engine 10 comprises contrarotating propellers aft, for example two unducted thrust-generating propellers 14, 16. It will be noted that the device is equally applicable, with even greater efficiency, to tractor-type propellers positioned at the rear of the fuselage. The two propellers 14 and 16 are arranged opposite one another and at a lower level than that of the horizontal tail unit 8.

Figure 2:
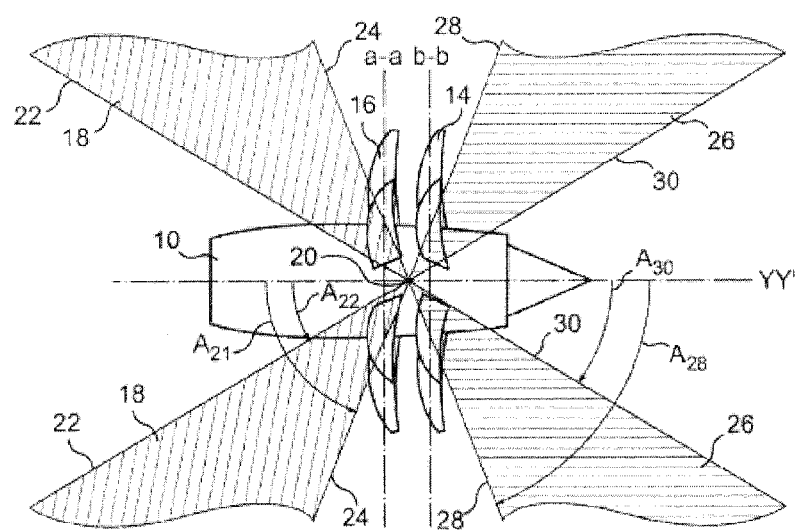
FIG. 2 shows diagrammatically a model (sufficiently far from the propellers) of the noise zones generated by the engine equipping the aircraft in FIGS. 1a and 1b.

In operation, the propellers 14 and 16 of each turboprop engine generate an interaction noise broadcast over several noise zones shown in FIG. 2 and defined as follows:

a first zone formed by a conical lobe 18 directed forwards from the turboprop engine and centred on the axis YY' thereof, the apex 20 of the lobe being located on said axis YY' in the middle of the median planes a-a and b-b of the propellers 14 and 16; the front conical lobe 18 being defined between an outer conical surface 22 of axis YY', apex 20 and having an angle $A_{22}$ at the apex comprised between 50° and 70° (according to the particular type of the turboprop engine) and an inner conical surface 24 of axis YY', apex 20 and having an angle at the apex $A_{24}$ comprised between 20° and 40° (according to the particular type of the turboprop engine) and a second zone formed by a conical lobe 26 directed aft from the turboprop engine and centred on the axis YY' thereof, the apex of this lobe 26 being merged with the apex 20; the aft conical lobe 26 being defined between an outer conical surface 28 of axis YY', apex 20 and having an angle $A_{28}$ at the apex comprised between 40° and 60° (according to the particular type of the turboprop engine) and an inner conical surface 30 of axis YY', apex 20 and having an angle at the apex $A_{30}$ comprised between 20° and 40° (according to the particular type of the turboprop engine).

Figure 1B:
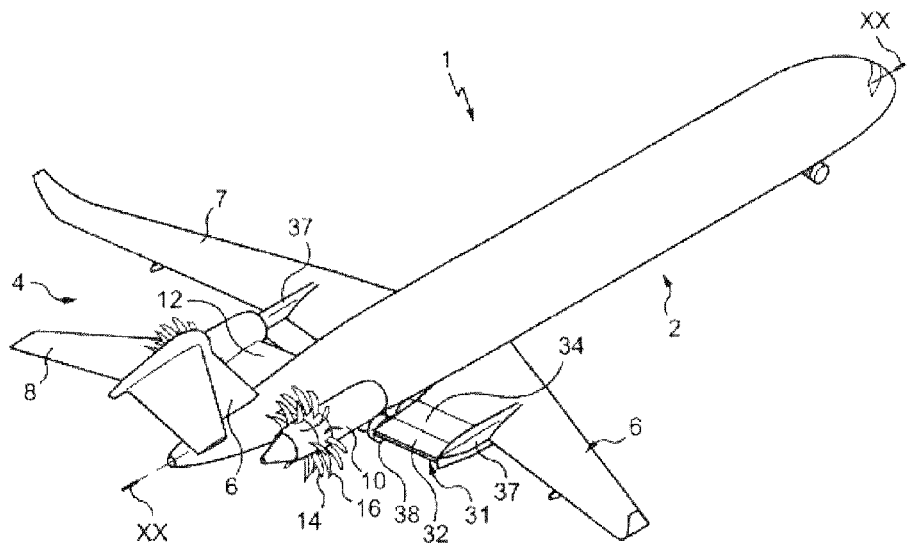
FIG. 1b represents the aircraft in FIG. 1a, the acoustic masking device of which is in the deployed position.
Figure 3:
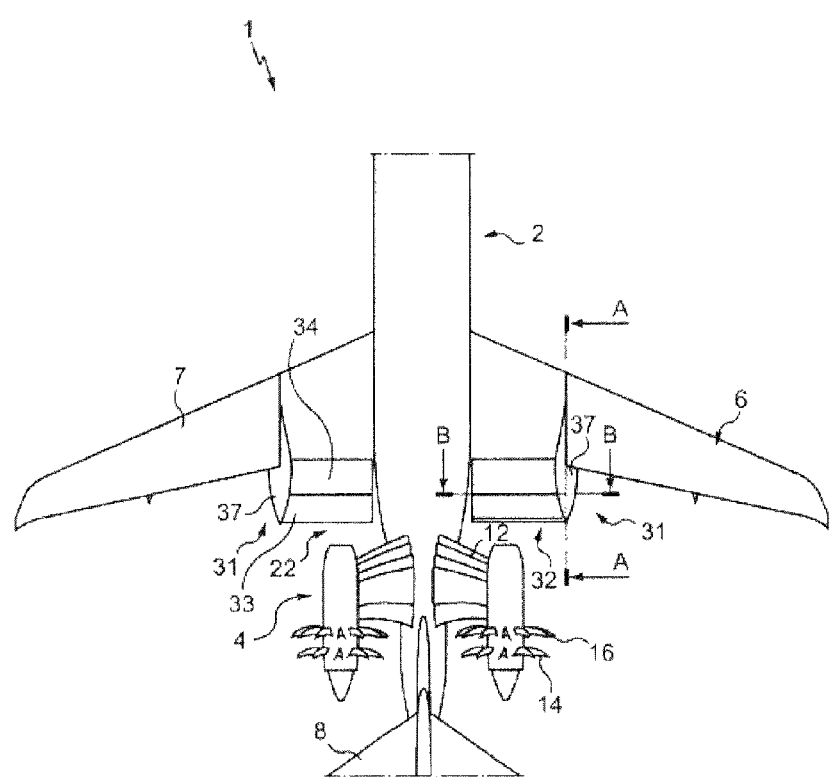
FIG. 3 is a partial top view of the aircraft in FIG. 1b.

As shown in FIGS. 1a and 1b, and more particularly in FIG. 3, an acoustic masking device 31 is associated with each of the wings 6, 7 and comprises generally at least one masking element 32 which is capable of moving between a retracted position and a deployed position. To this end, means of moving the masking element are provided as described hereinafter.

This masking element, in its deployed position, is intended to intercept the forward-directed noise zone as defined above. Thus, the perception on the ground of the noise broadcast by the turboprop engines is reduced.

This masking element comprises here at least one flap and, for example, a rigid main flap 33 and a flexible secondary flap composed for example of a fabric 34 tensioned between the leading edge of the mobile flap 33 and the aft, for example fixed, longeron of the aerofoil.

Figure 4A:
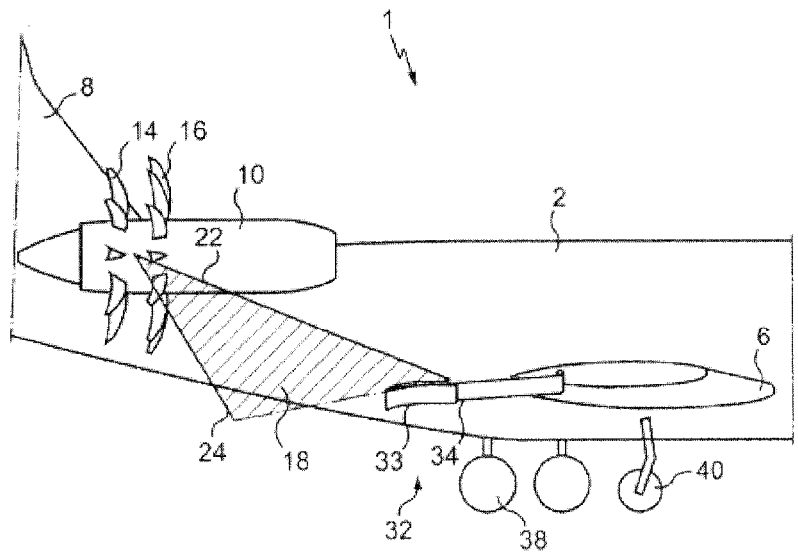
FIG. 4a is a schematic view in cross section along the line A-A of the aircraft in FIG. 3.
Figure 4B:
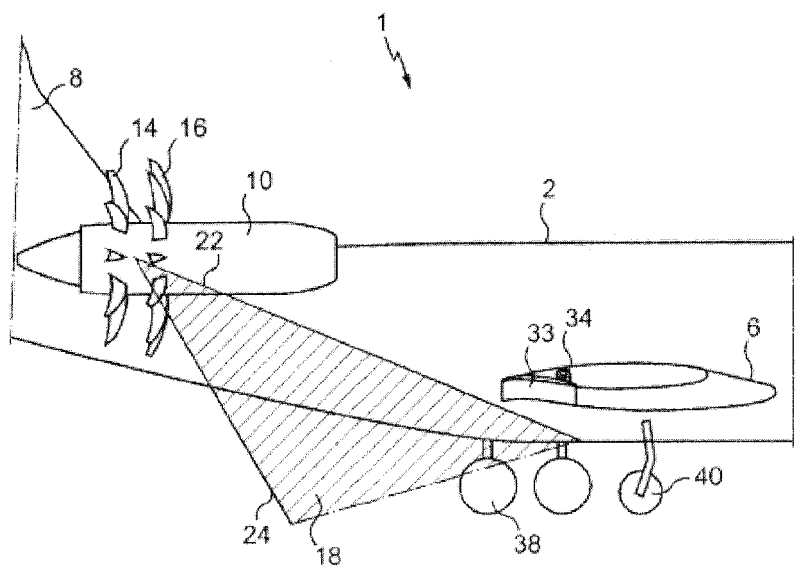
FIG. 4b is a diagrammatic view similar to that in FIG. 4a but with the masking device in the retracted position.

As shown in FIGS. 4a and 4b, the main flap 33 of the masking element 32 intercepts the front conical lobe 18 of noise when it is deployed.

Moreover, as described previously with reference to FIGS. 1a and 1b, as the turboprop engines 10 are mounted at the rear of the aircraft between the wings 6, 7 and the horizontal tail unit 8, the aft conical lobe 20 of noise is itself intercepted by the horizontal tail unit 8.

The position of the horizontal tail unit 8 in conjunction with the addition of the acoustic masking device 31 therefore make it possible to further reduce the perception on the ground of the noise caused by the interaction of the propellers. It will be noted however that in other configurations the aft tail unit can be arranged differently, and thus not interfere with the aft conical lobes 20 of noise of the turboprop engines.

The secondary flap 34 constitutes a means of blocking any free space between the mobile main flap (interception flap) and the fixed aerofoil for acoustic reasons. On the other hand, in the case of a low-speed flight, a system of slots (partial blocking) makes it possible to obtain improved aerodynamic performance. This space left free is due to the fact that the size of the main flap is insufficient when the latter is moved aft (deployed position) to the maximum in order to occupy the whole of the existing space between its leading edge and the aerofoil. The addition of a secondary flap makes it possible to move the main flap further aft and correspondingly increase the chord at the root of the aerofoil, in particular when the size of the main flap is fixed. Alternatively the free space can be blocked by one or more rigid flaps.

As described hereinafter, when the masking element is in the retracted position, the masking device is housed in a space arranged for this purpose inside the wing of the aircraft, or simply under the latter, in contact with its lower surface. In the latter case, it is necessary to provide a fairing or projections covering certain elements of the masking device in order to obtain an underwing profile that is as smooth as possible and therefore reduce the impact of their presence on the aerodynamics of the wing, particularly at high speed.

Figure 5A:
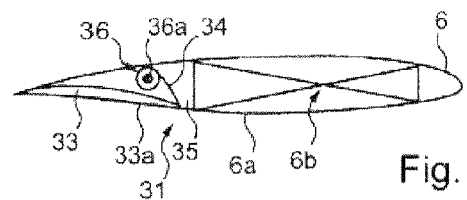
FIG. 5a is a view in cross section of a first embodiment of an acoustic masking device in the retracted position.
Figure 5B:
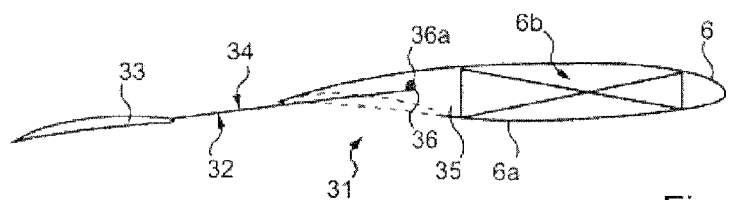
FIG. 5b is a view in cross section of the masking device in FIG. 5a in the deployed position.

In a first embodiment of a masking device shown in FIGS. 5a-b, the masking element 32 comprises a main flap 33 and a secondary flap 34 fixed to said main flap. The flap 34 is constituted by a flexible fabric which can be stored in the rolled position as shown in FIGS. 4b and 5a.

This storage is carried out in a space 35 arranged for this purpose in the wing of the aircraft (in the aft portion including the trailing edge), such that the main flap 33, when it is in the retracted position, is positioned flush with the outer surface of the wing (here the underwing). More particularly, the lower portion 33a of the flap itself constitutes a portion of the underwing which extends the upstream fixed portion 6a of the underwing. The aft space 35 is designed so as to leave sufficient space inside the wing to allow fuel tanks to be fitted. Thus, the inner zone 6b of the wing situated upstream of the space 35 can be used to house fuel tanks.

The aircraft is provided moreover with a rolling/unrolling system 36 allowing the fabric 34 to be rolled and unrolled according to the masking requirements. This system is shown in greater detail in FIGS. 5a-b and 6a-b.

The rolling/unrolling system 36 is housed in the space 35 and comprises a spindle 36a around which the fabric 34 is rolled. The spindle 36a can be driven in rotation by a spring mechanism (not shown). Alternatively, the spindle is mechanically assisted on moving the traveler(s) of a system of traveler(s) and track(s) capable of constituting the means of moving the masking element 32. Such a system is described hereinafter and shown in FIGS. 8 and 9.

The advantage of such an embodiment resides in its very light weight in comparison with a secondary flap composed of one or more rigid flaps and not a fabric.

Figure 6A:
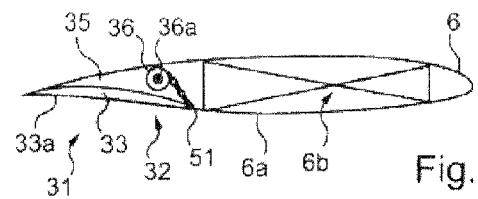
FIG. 6a is a view in cross section of a second embodiment of an acoustic masking device in the retracted position.
Figure 6B:
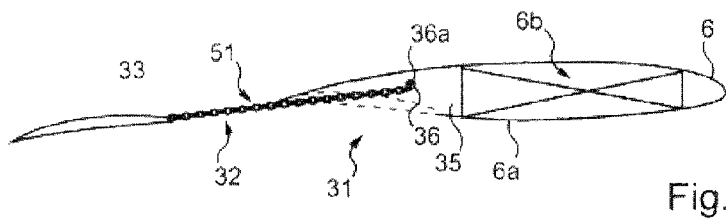
FIG. 6b is a view in cross section of the masking device in FIG. 6a in the deployed position.

In a second embodiment shown in FIGS. 6a-b, the masking element 32 comprises a main flap 33 and a secondary flap constituted by a semi-rigid fabric 51. The fabric 51 is constituted by hollow slats hinged to each other so as to be capable of being rolled around the spindle in the manner of a domestic roller shutter.

As in the embodiment described previously, the fabric 51 is also stored rolled in a space 35 provided for this purpose in the wing 6, in the same way as the rolling/unrolling system 36.

This second embodiment confers a greater robustness on the masking device, due to the greater strength of a slatted fabric in comparison with a cloth fabric.

Figure 7A:
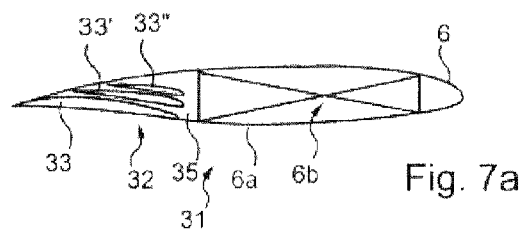
FIG. 7a is a view in cross section of a third embodiment of an acoustic masking device in the retracted position.
Figure 7B:
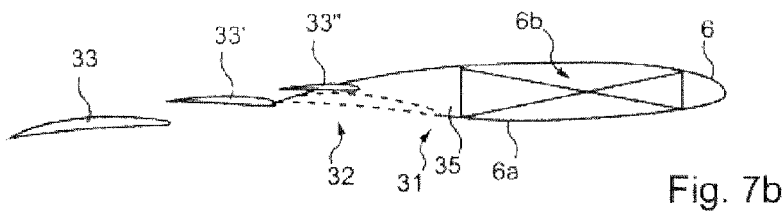
FIG. 7b is a view in cross section of the masking device in FIG. 7a in the deployed position.

In a third embodiment, the masking element 32 comprises a plurality of rigid flaps (33, 33', 33"), for example three in FIGS. 7a-b. These three flaps (33, 33', 33") are for example homothetic and capable of sliding over each other.

In this case, for example, each flap is deployed and retracted using systems of traveler(s) and track(s) (not shown in this figure) described hereinafter and shown in FIG. 8.

In the retracted position, the flaps (33, 33', 33") are superimposed inside the wing (FIG. 7a) in the aft inner space 35. In the deployed position, the downstream edge of the smallest of the flaps 33" which is the closest to the wing 6 overlaps the upstream edge of the intermediate flap 33'. The downstream edge of the intermediate flap 33' overlaps the upstream edge of the largest of the flaps 33 which is the furthest from the wing.

Overlapping the flaps allows the curve of the joined upper surfaces of the flaps to be made smoother, thus making the masking element that they compose more aerodynamic overall. In the deployed position, the slots between the flaps are preferably reduced in order to maximize the effect of acoustic masking. However, a compromise can be found between acoustic efficiency and the benefit contributed by the aerodynamics of the slots.

This third embodiment makes it possible to dispense with a rolling/unrolling system and occupies almost the same inner volume of the space 35 as the two previous embodiments with the rolling/unrolling system.

Thus, in the deployed position, the extension of the masking element 32 of the three previous embodiments significantly increases the chord at the root of each wing.

The embodiment shown in FIGS. 7a and 7b is preferred because it is more robust. Different means of moving a masking element are shown in greater detail in FIGS. 8, 9 and 10a-b.

Figure 8:
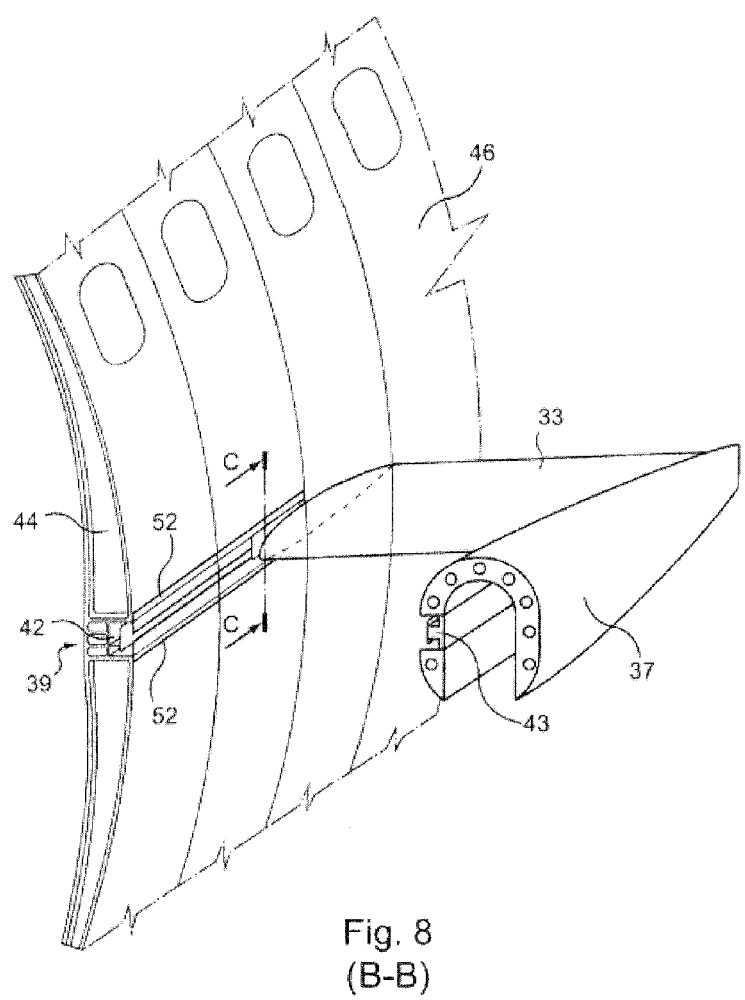
FIG. 8 is a diagrammatic perspective view along the section B-B in FIG. 3.

FIGS. 8 and 9 show a first possibility for producing these movement means.

Thus, the acoustic masking device 31 comprises a system 39 of travelers, and tracks serving to guide the movement of the traveler during the movement of the masking element(s), here for example the flap 33. In the embodiments in FIGS. 5a-b, 6a-b and 7a-b, the system of travelers and tracks guides the main flap 33, the secondary elements fixed to the latter being carried along by its movement.

As shown in FIG. 8, and also in FIGS. 1a-b, 3, 4a and 4b, the aircraft 1 can comprise fairings 37 linked to the aerofoil 4. In this case, these are the fairings known as "Küchemann" fairings, situated approximately in the middle of each of the wings 6.7 of the aerofoil 4.

The system of travelers and tracks 39 comprises, on the one hand, two tracks 42, 43 situated respectively in the fuselage 2 and the fairing 37 and, on the other hand, two travelers slidably arranged with respect to one of the tracks (only the traveler 41 of the fuselage 2 and the track 42 are shown in FIG. 8).

More precisely, the track 42 of the fuselage is situated in a cavity arranged in the frame 44 of the fuselage 2, so as not to project with respect to the external surface of the panel 46 of the fuselage for aerodynamic reasons.

The travelers are intended to ensure aft (deployment) and forward (retraction) translational movement of the main flap 33 while ensuring that the stresses, mainly due to the dynamic pressure and aerodynamic lift applied thereto, are absorbed.

The travelers are carried along in translation for example using a nut and bolt assembly or by a wormwheel mechanism controlled by a push rod. These two solutions are known per se in the field of high-lift systems, being present in particular in commercial aircraft of the A300B and A320 type.

As shown in the diagrammatic cross section in FIG. 9, the system comprises a ball joint connection between the main flap 33 (shown in part) and the traveler 41 in order to make the mechanical connection as little hyperstatic as possible. The same connection is used between the flap and the traveler associated with the track 43 (FIG. 8).

In order to provide movement without play and without friction, the travelers, such as the traveler 41 in FIG. 9, comprise various rollers 50.

Lip seals 52 are in contact respectively with the upper surface and the lower surface of the main flap 33 in order to limit the penetration of water and air into each of the cavities receiving one of the travelers and one of the tracks 42, 43.

According to a second possible embodiment shown in FIGS. 10a-b, the means of moving the masking element 32 of the acoustic masking device 31 comprise a deformable parallelogram 54. In these figures, the masking element 32 is constituted by a single flap 55.

This deformable parallelogram 54 is constituted by two guide arms 56 and two movement rods 58.

The guide arms 56, which are identical, have an elongated shape with a small thickness, and a width that increases gradually from one end of the rod to the other.

One end A of the guide arms 56 is fixed by its inner face to the masking element 32 close to its upstream end but at a distance therefrom. The opposite end D of the guide arms 56 is left free.

Each guide arm remains in permanent contact at a point with the movement rod 58 on which it is capable of sliding.

The movement rods 58 have a general shape that is similar to that of the guide arms 56.

One of their ends B is fixed to the upstream end of the masking element 32 by its inner face and their opposite end C is fixed to a torsion bar 60 oriented perpendicularly to their longitudinal axis, for example by embedding.

The torsion bar 60 is presented in the form of a tube. Its movement about the axis y shown in FIGS. 10a and 10b is ensured either by a telescopic cylinder (not shown) housed between the flap and the aft longeron of the aerofoil or by a rotary cylinder (not shown) housed in the fuselage.

Load-bearing rods 62 absorb loads perpendicular to the plane of the guide arms 56, thus making it possible to limit the inertia of the rods.

The acoustic masking device is positioned under the wing, the torsion bar 60 being linked to the longerons by strong ribs and using supports (not shown).

Alternatively in a first embodiment variant (not shown), the mass of the guide arms 56 is increased in order to dispense with the loadbearing rods 62.

In a second variant embodiment (not shown), the masking element 32 comprises two flaps and an additional support half-way between the supports linking the first flap to the wing is added.

In a third variant embodiment (not shown), the torsion bar 60 is no longer used for carrying out the movement but only for synchronizing the movement of the movement rods and the guide arms. Cylinders are then added at the level of each support.

The mechanism composed of a deformable parallelogram has the advantage of being largely housed within the thickness of the aerofoil 4. Only two small projections in the skin of the underwing are necessary in order to cover the ends A and B which extend slightly beyond the profile. This makes it possible to avoid adding a flap track and associated fairing at the level of the lower surface of the aerofoil.

This second possible embodiment is particularly suited to the aerofoils having a large internal volume known as "Yehudi" (inner volume located inside the knee of the trailing edge, i.e. between the knee of the trailing edge and the fuselage). Moreover, the components of this second possibility have the advantage of being simple, and its mass as well as the aerodynamic penalties caused are low.

In a general configuration, the wings of an aircraft such as that in FIGS. 1a-b do not carry an engine and have not been moved aft (by moved-aft position of the wings is meant a wing position that is further from the nose of the aircraft by comparison with their position on a standard aircraft, in particular a commercial aircraft the wings of which are situated in a position which is at a distance from the nose of the aircraft comprised between 50% and 55% of the length of the fuselage; the moved-aft therefore means in this case wings situated beyond 55% of the length of the fuselage) or, in any case, only moved slightly aft, thanks to the addition of the system of acoustic masking according to the invention. This general configuration makes it possible to implement the following aerodynamic features:

reducing the sweep, which increases the maximum aerodynamic lift of the aircraft, and therefore the low-speed performance; and increasing the aspect-ratio of the wings (which is the ratio of the wingspan to the square of the surface of said wing), which gives them a high lift-over-drag ratio.

Thus, the aircraft has excellent performance on takeoff and landing, in particular the ability to rise into the air more quickly and to land more slowly. This contributes to an even further reduction in the noise generated on takeoff and landing.

Moreover, this optimized configuration makes it possible to improve the performance of the aircraft significantly in terms of fuel consumption and reduction in drag. In fact, the aspect-ratio reduces the drag induced and the reduction in the sweep makes it possible to envisage a partially streamlined aerofoil. In the case of such a configuration, a system of flaps using movement of the traveler(s) and track(s) type is preferred, as well as the use of so-called Küchemann fairings.

Preferably, the sweep is at most equal to 22° and the aspect-ratio is at least equal to 10. Preferably, the aspect-ratio is comprised between 10 and 14 and the sweep is comprised between 17° and 22° (a sweep that is too low would require the cruising speed to be reduced).

As shown in FIG. 11, the aircraft 1 also has two fairings 37, an undercarriage 38 and two auxiliary undercarriages 40 of the shock-compensating rocker beam type.

Alternatively, the undercarriages are housed in the fairings 37.

The auxiliary undercarriages 40 of the shock-compensating rocker beam type are known to a person skilled in the art for example under the name of B-47, B-52, U-2 or can be different from these.

The advantage of the configuration shown in FIG. 11 is that the aerofoil 4 does not need to support the central undercarriage, which consequently reduces the loads introduced therein, and makes it possible to minimize the size of the fairings 37.

In this way, it is possible to further reduce the sweep and further increase the aspect-ratio of the wings in order to increase the performance, because the aerofoil does not need to be of sufficiently large volume to make it possible to incorporate an undercarriage having a sufficient track to provide stability on the ground.

It should be recalled however that the present invention does not exclude a case where the aerofoil would need to be moved aft to the extent of requiring the addition of an aerofoil surface called a noseplane to the front of the fuselage.

The acoustic masking device contributes greatly to the reduction of the noise perceived on the ground and constitutes an alternative to setting back the aerofoil or an increase in the chord. According to a particular configuration, a masking element having a length of 1.5 m (the maximum being of the order of 2.2 m) has the same effect as a joint increase in the chord of the tail unit and of the aerofoil of 20%.

Although the figures show only the example of an aircraft with a turboprop engine with propellers, the present concept can be applied to aircraft equipped with other types of engines such as turbofans positioned on the aft fuselage of the aerofoil.

These aircraft are typically aircraft of SFN (side fuselage nacelle) type in which the two engines are situated at the rear of the fuselage on both sides of the latter, or RFN.

Given the position of the engines with respect to the axis of the aircraft in such cases, the upstream noise zone generated by the fan is situated at the level of the wing root. It can therefore be intercepted by an acoustic masking device according to the invention.

The invention claimed is:

1. Aircraft with reduced environmental impact, comprising at least one engine mounted on the back of the aircraft and generating noise forwards, and an aerofoil, the noise generated by said at least one engine being broadcast in a noise zone, characterized in that said aircraft comprises at least one acoustic masking device comprising at least one masking element which is capable of moving between a retracted position and a deployed position in which said at least one masking element intercepts the noise zone so as to reduce the perception on the ground of the noise broadcast by said at least one engine, the acoustic masking element being moved aft in its deployed position so as to increase the chord at the root of the aerofoil.

2. Aircraft according to claim 1, characterized in that the masking element is in a retracted position in the cruising phase and in a deployed position in the take-off, landing and/or approach phase.

3. Aircraft according to claim 1, characterized in that it comprises moreover a fuselage provided with an aerofoil comprising two symmetrical wings, said at least one engine being mounted at the rear of the aircraft between said wings and the rear end of the aircraft.

4. Aircraft according to claim 1, characterized in that the aircraft comprises moreover a fuselage provided with an aerofoil comprising two symmetrical wings and at least one horizontal aft tail unit, said at least one engine being mounted at the rear of the aircraft between said wings and said horizontal tail unit, an acoustic masking device being associated with each of the wings, said at least one masking element of each device being capable of moving between a retracted position and a deployed position so as to increase the chord at the root of each of the wings.

5. Aircraft according to claim 1, characterized in that said at least one device comprises means of moving said at least one masking element.

6. Aircraft according to claim 1, characterized in that said at least one masking element of said at least one device is composed of at least one flap.

7. Aircraft according to claim 6, characterized in that said at least one masking element comprises a main flap and at least one secondary flap.

8. Aircraft according to claim 7, characterized in that the main flap is rigid and said at least one secondary flap is made of a flexible fabric.

9. Aircraft according to claim 8, characterized in that said at least one acoustic masking device comprises a rolling/unrolling system making it possible to roll and unroll the flexible fabric.

10. Aircraft according to claim 1, characterized in that said at least one acoustic masking device comprises a system of traveler(s) and track(s) serving to guide the movement of the traveler when said at least one masking element is moved.

11. Aircraft according to claim 10, characterized in that it comprises moreover at least one fairing linked to the aerofoil, the system of traveler(s) and track(s) comprising two tracks housed respectively in the fuselage and in said at least one fairing.

12. Aircraft according to claim 10, characterized in that it comprises moreover two fairings linked to the aerofoil, a central undercarriage and two auxiliary undercarriages of the shock-compensating rocker beam type, respectively housed in the two fairings.

13. Aircraft according to claim 11, characterized in that the fairing(s) are fairings known as "Küchemann" fairings, situated substantially in the middle of each of the wings of the aerofoil.

14. Aircraft according to claim 5, characterized in that the movement means of said at least one masking element comprise a deformable parallelogram.

15. Aircraft according to claim 14, characterized in that the deformable parallelogram comprises at least one torsion bar, at least one guide arm and at least one movement rod, the movement of said parallelogram being ensured by the rotation of said torsion bar.

16. Aircraft according to claim 3, characterized in that said wings have a small sweep and a high aspect-ratio so as to reduce the fuel consumption.

17. Aircraft according to claim 1, characterized in that it comprises, at the front of the fuselage, an aerofoil surface called a noseplane.

* * * * *